Jan. 15, 1935.     J. C. KARNES ET AL     1,987,625
CHAMBER FOR THE PROJECTION OF MULTIPLE IMAGE RECORDS
Filed June 12, 1930
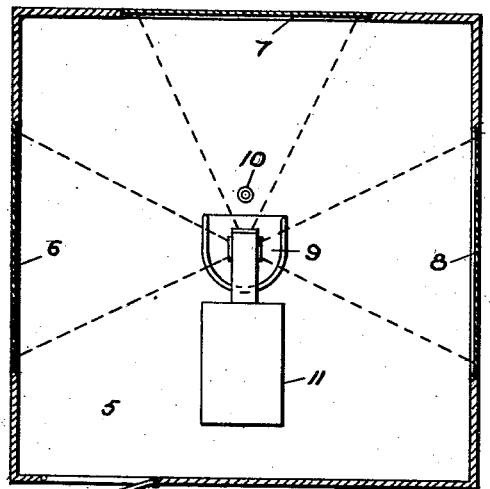
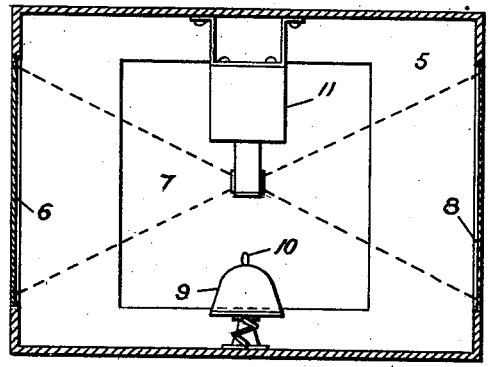
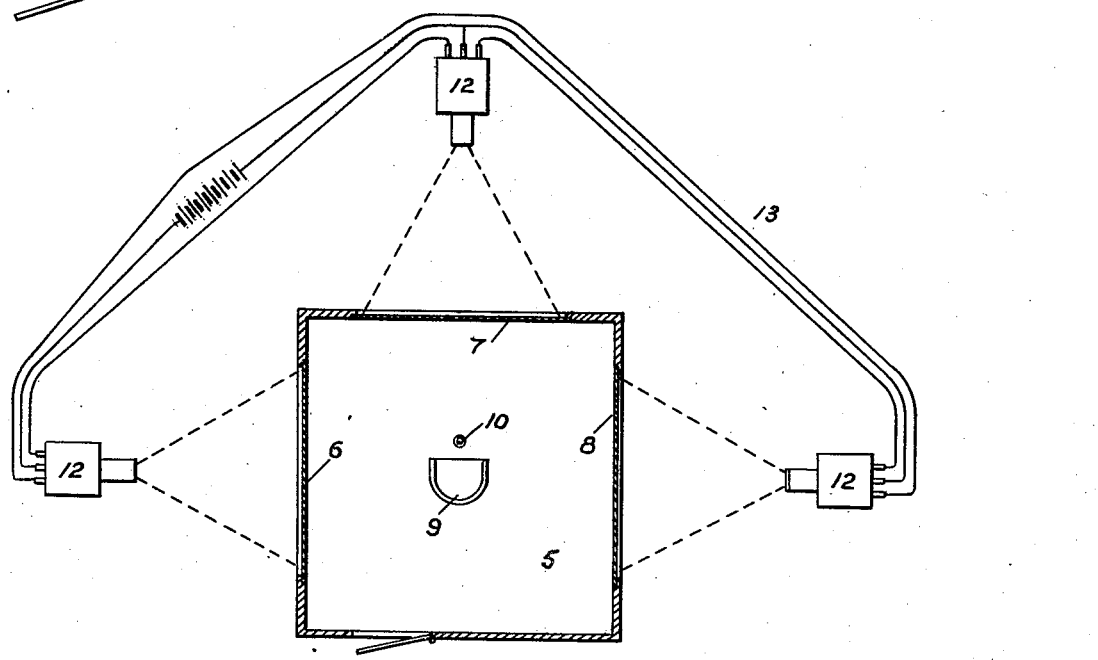
INVENTORS
J. C. Karnes
BY G. J. Kessenich
W. N. Roach
ATTORNEY.

Patented Jan. 15, 1935

1,987,625

UNITED STATES PATENT OFFICE 1,987,625

CHAMBER FOR THE PROJECTION OF MULTIPLE IMAGE RECORDS

James C. Karnes, Buffalo, N. Y., and Gregory J. Kessenich, Madison, Wis.

Application June 12, 1930, Serial No. 460,740

2 Claims. (Cl. 35—12)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a chamber for the projection of multiple image records.

The purpose of the invention is to provide a chamber for use in training student pilots of airplanes through the aid of projected motion pictures. The field of view of a pilot in a plurality of directions is to be pictorially reproduced on a plurality of screens arranged around the chamber.

Fig. 1 is a plan view of a chamber constructed in accordance with the invention and equipped with a single projecting machine for projecting image records onto a plurality of screens;

Fig. 2 is a view in rear elevation of Fig. 1;

Fig. 3 is a similar view showing an arrangement for employing a plurality of synchronized projecting machines.

Referring to the drawing by numerals of reference:

In Fig. 1 there is shown a chamber or compartment 5 provided with a plurality of screens 6, 7 and 8 which are disposed in different planes. In the present instance the end or side screens 6 and 8 are perpendicular to the intermediate or front screen 7 but it is to be understood that the angular relation between the screens may be varied.

At a point equi-distant from the screens there is a seat 9 which is to be occupied by an observer who, for example, is to undergo instruction. A control mechanism 10 immediately in front of the seat is of the type employed in the particular vehicle from which the image records to be projected on the screen have been made.

A motion picture projecting machine 11 for projecting a multiple film is placed directly above the seat so that it will be clear of the head of an occupant of the seat.

In Fig. 3 individual projecting machines 12—12—12 arranged in synchronism, as represented by the wiring 13, are provided for each of the screens.

The image records to be projected on the screens are made with a camera which is positioned over the seat of an airplane to simulate the eyes of an occupant of the seat. The frontal and lateral fields of view of the camera are therefore representative of the fields of view of the occupant of the seat.

As the airplane performs evolutions the change of environment will be recorded in the image records. When such image records are projected onto the screen an impression of reality will be conveyed and the observer or student undergoes instruction in the operation of the control mechanism while the pictorial record of changes in environment is presented to his view. At any time during such presentation a student may shift his view laterally and will see the exact picture that he would see if he were actually in the plane.

We claim:

1. In a device for giving instruction in the piloting of a vehicle, a seat for a student, a device simulating a control mechanism and adapted to be operated by the student, a plurality of screens arranged in different planes about the seat and observable therefrom, and means for simultaneously projecting onto the screens motion pictures simultaneously taken at an angular relation corresponding to the planes of the screens.

2. In a device for giving instruction in the piloting of a vehicle, a seat for a student, a device simulating a control mechanism and adapted to be operated by the student, and means for exhibiting on different sides of the seat a motion picture representation of a panorama as viewed from the vehicle.

JAMES C. KARNES.
GREGORY J. KESSENICH.